(12) United States Patent
Hewitt et al.

(10) Patent No.: US 11,032,091 B2
(45) Date of Patent: *Jun. 8, 2021

(54) BALANCED CONFORMITY IN CHAT CONVERSATIONS

(71) Applicant: INTERNATIONAL BUSINESS MACHINES CORPORATION, Armonk, NY (US)

(72) Inventors: Trudy L. Hewitt, Cary, NC (US); Jeremy R. Fox, Georgetown, TX (US); John Kennedy, Goatstown (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,683

(22) Filed: May 28, 2020

(65) Prior Publication Data

US 2020/0295960 A1 Sep. 17, 2020

Related U.S. Application Data

(63) Continuation of application No. 16/103,082, filed on Aug. 14, 2018, now Pat. No. 10,721,086.

(51) Int. Cl.
*H04L 12/18* (2006.01)
*H04L 12/58* (2006.01)
*G06F 40/30* (2020.01)

(52) U.S. Cl.
CPC .......... *H04L 12/1822* (2013.01); *G06F 40/30* (2020.01); *H04L 12/1831* (2013.01); *H04L 51/12* (2013.01)

(58) Field of Classification Search
CPC ...... G06Q 10/10; G06Q 10/107; G06Q 15/26; H04L 12/1822; H04L 12/1831;
(Continued)

(56) References Cited

U.S. PATENT DOCUMENTS 6,425,012 B1 * 7/2002 Trovato .............. H04L 12/1818
348/E7.071
6,795,808 B1 9/2004 Strubbe et al.
(Continued)

OTHER PUBLICATIONS

Anonymous, "Bandwagon effect," https://en.wikipedia.org/wiki/Bandwagon_effect, Wikipedia, accessed Aug. 13, 2018, 5 pages.
(Continued)

*Primary Examiner* — Sargon N Nano
(74) *Attorney, Agent, or Firm* — Michael O'Keefe; Andrew D. Wright; Roberts Calderon Safran & Cole, P.C.

(57) ABSTRACT

Methods and systems for balanced conformity in chat conversations are disclosed. A method includes: collecting, by a computing device, data from an ongoing group chat; determining, by the computing device, a baseline tone for a plurality of participants in the ongoing group chat using the collected data; determining, by the computing device, a current tone for the plurality of participants in the ongoing group chat using the collected data; determining, by the computing device, a conformity risk score using the baseline tone and the current tone for the plurality of participants in the ongoing group chat; and in response to determining that the conformity risk score exceeds a first predetermined threshold, the computing device automatically inviting an additional participant to join the ongoing group chat.

20 Claims, 4 Drawing Sheets (58) Field of Classification Search
CPC ....... H04L 51/12; H04L 51/046; H04L 51/14;
H04L 51/30; H04L 67/02; H04L 51/24;
H04L 12/18; H04L 12/58; H04L 51/02;
H04L 43/04; H04L 12/1813; H04L 41/06;
H04L 12/5093; G06F 40/30; H04M
1/72552; H04W 12/0608; H04W 4/14;
H04W 12/06; G10L 15/26
See application file for complete search history.

(56) References Cited

U.S. PATENT DOCUMENTS

| | | | | |
|---|---|---|---|---|
| 7,006,616 | B1* | 2/2006 | Christofferson | H04L 65/4038 |
| | | | | 379/202.01 |
| 7,522,911 | B2 | 4/2009 | Ung et al. | |
| 7,769,705 | B1 | 8/2010 | Luechtefeld | |
| 8,600,779 | B2 | 12/2013 | Booth et al. | |
| 8,713,106 | B2 | 4/2014 | Spataro et al. | |
| 8,818,926 | B2* | 8/2014 | Wallace | G06Q 30/02 |
| | | | | 706/47 |
| 8,977,566 | B2 | 3/2015 | Jung et al. | |
| 9,380,017 | B2* | 6/2016 | Gelfenbeyn | H04L 51/32 |
| 9,710,142 | B1 | 7/2017 | Vendrow et al. | |
| 9,912,810 | B2* | 3/2018 | Segre | H04M 3/5166 |
| 10,042,900 | B2* | 8/2018 | Beausoleil | G06F 40/186 |
| 10,187,337 | B2* | 1/2019 | Smullen | H04L 63/18 |
| 10,366,168 | B2* | 7/2019 | Wu | G06F 40/56 |
| 10,389,662 | B2 | 8/2019 | Chudge et al. | |
| 10,437,437 | B1* | 10/2019 | Ledet | H04L 65/403 |
| 10,447,622 | B2 | 10/2019 | Patel et al. | |
| 10,615,695 | B1* | 4/2020 | Pirozzi | H02M 3/1582 |
| 10,708,216 | B1* | 7/2020 | Rao | G06Q 50/01 |
| 2004/0111479 | A1 | 6/2004 | Borden et al. | |
| 2006/0067500 | A1* | 3/2006 | Christofferson | H04M 3/568 |
| | | | | 379/202.01 |
| 2007/0150335 | A1 | 6/2007 | Arnett et al. | |
| 2007/0294229 | A1* | 12/2007 | Au | G06Q 30/02 |
| 2009/0220064 | A1 | 9/2009 | Gorti et al. | |
| 2010/0164947 | A1 | 7/2010 | Bolger et al. | |
| 2011/0078105 | A1* | 3/2011 | Wallace | G06Q 30/02 |
| | | | | 706/47 |
| 2011/0252108 | A1* | 10/2011 | Morris | H04L 51/32 |
| | | | | 709/206 |
| 2012/0011158 | A1 | 1/2012 | Avner et al. | |
| 2012/0271712 | A1 | 10/2012 | Katzin et al. | |
| 2013/0124189 | A1 | 5/2013 | Baldwin | |
| 2013/0290195 | A1 | 10/2013 | Frazier et al. | |
| 2014/0188457 | A1 | 7/2014 | Fink et al. | |
| 2016/0019549 | A1 | 1/2016 | Maizuddin et al. | |
| 2016/0026962 | A1 | 1/2016 | Shankar et al. | |
| 2016/0042359 | A1 | 2/2016 | Singh | |
| 2016/0203831 | A1 | 7/2016 | Elyashiv et al. | |
| 2017/0085595 | A1 | 3/2017 | Ng et al. | |
| 2018/0018636 | A1 | 1/2018 | Bisti et al. | |
| 2018/0054523 | A1* | 2/2018 | Zhang | G06N 5/04 |
| 2018/0145934 | A1 | 5/2018 | Pappu et al. | |
| 2018/0324116 | A1 | 11/2018 | Vaduva | |

OTHER PUBLICATIONS

Bikhchandani et al., "A Theory of Fads, Fashion, Custom, and Cultural Change as Informational Cascades," Journal of Political Economy, vol. 100, No. 5 (Oct. 1992), pp. 992-1026, 35 pages.
Lohmann, "The Dynamics of Informational Cascades: The Monday Demonstrations in Leipzig, East Germany, 1989-91," World Politics, vol. 47, Issue 1 (Oct. 1994), 42-101, 60 pages.
List of IBM Patents or Patent Applications Treated as Related, dated May 26, 2020, 1 page.

* cited by examiner

BALANCED CONFORMITY IN CHAT CONVERSATIONS

BACKGROUND

The present invention generally relates to computing devices and, more particularly, to methods and systems for balanced conformity in chat conversations.

A group chat session typically includes a plurality of participating users who are discussing a particular topic. The group chat session typically takes place within a graphical user interface that displays real-time responses from each of the plurality of participating users. The responses commonly include text, graphics, videos, sounds, and/or attachments such as files. Each of the responses are normally arranged in order of a time when a user sent the response. Additionally, the graphical user interface typically displays a list of the plurality of participating users.

SUMMARY

In a first aspect of the invention, there is a method that includes: collecting, by a computing device, data from an ongoing group chat; determining, by the computing device, a baseline tone for a plurality of participants in the ongoing group chat using the collected data; determining, by the computing device, a current tone for the plurality of participants in the ongoing group chat using the collected data; determining, by the computing device, a conformity risk score using the baseline tone and the current tone for the plurality of participants in the ongoing group chat; and in response to determining that the conformity risk score exceeds a first predetermined threshold, the computing device automatically inviting an additional participant to join the ongoing group chat.

In another aspect of the invention, there is a computer program product that includes a computer readable storage medium having program instructions embodied therewith. The program instructions are executable by a computing device to cause the computing device to: collect data from an ongoing group chat; determine a conformity risk score indicating a probability of conformity among a plurality of participants in an ongoing group chat using the collected data; in response to determining that the conformity risk score exceeds a first predetermined threshold but does not exceed a second predetermined threshold, display a message prompting the plurality of participants to engage in additional conversation; and in response to determining that the conformity risk score exceeds the first predetermined threshold and the second predetermined threshold, automatically invite an additional participant to join the ongoing group chat.

In another aspect of the invention, there is a system that includes: a hardware processor, a computer readable memory, and a computer readable storage medium associated with a computing device; program instructions configured to collect data from an ongoing group chat; program instructions configured to determine a baseline tone for a plurality of participants in the ongoing group chat using the collected data; program instructions configured to determine a current tone for the plurality of participants in the ongoing group chat using the collected data; program instructions configured to determine a conformity risk score using the baseline tone and the current tone for the plurality of participants in the ongoing group chat; and program instructions configured to, in response to determining that the conformity risk score exceeds a first predetermined threshold, automatically invite an additional participant to join the ongoing group chat, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for balanced conformity in chat conversations. As described herein, aspects of the invention include a method and system that determine affinities of users through analysis of past chat conversations and then establish a normalized playing field for further interaction by balancing the perspectives of the chat participants (e.g., adding participants with different tones or sentiments for a topic associated with the group chat). In embodiments, the method and system determine a baseline affinity within a particular chat conversation, and when a significant conformity risk is detected, the method and system trigger an alert (e.g., prompting participants to engage in further discussion on a topic associated with the group chat) and/or take actions to address the conformity risk and normalize the playing field (e.g., adding participants with different tones or sentiments for a topic associated with the group chat).

Digital group chat conversations are a form of communication commonly used for both work and personal purposes. A group chat conversation becomes unbalanced when people decide to ignore their personal information signals and follow the behavior of others. In particular, a group chat conversation becomes unbalanced and skewed toward a particular perspective or point of view, in a bandwagon effect, when one or more group chat participants have known (e.g., published) affinities on topics pertaining to the group chat. Conventional group chat methods and systems do not provide a mechanism to ensure that a group chat conversation includes a balanced set of perspectives and avoids the bandwagon effect.

Embodiments of the invention address the above-mentioned shortcomings associated with conventional group chat methods and systems. As described herein, aspects of the invention include a method and system that determine an influence or seniority ranking of each participant in a group chat, determine a baseline tone or sentiment for a topic associated with the group chat, monitor the group chat to determine an expected effect associated with adding an additional participant with a particular point of view on the topic associated with the group chat, determine a conformity probability and an associated conformity risk score, and determine an action to take to mitigate a risk of conformity based on the conformity risk score. Additionally, aspects of the invention include a learning engine that monitors the action taken to determine if a level of conformity was reduced.

Embodiments improve the functioning of a computer by providing methods and systems for balanced conformity in chat conversations. In particular, embodiments improve software by providing mechanisms for monitoring a group chat to determine an expected effect associated with adding an additional participant with a particular point of view on the topic associated with the group chat, determining a conformity probability and an associated a conformity risk score, and determining an action to take to mitigate a risk of conformity based on the conformity risk score. Additionally, embodiments improve software by providing a learning engine that monitors the action taken to determine if a level of conformity was reduced and tunes the thresholds used to determine the action to take. Additionally, implementations of the invention use techniques that are, by definition, rooted in computer technology (e.g., machine learning, natural language processing, a group chat graphical user interface, chat bots, etc.) that cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
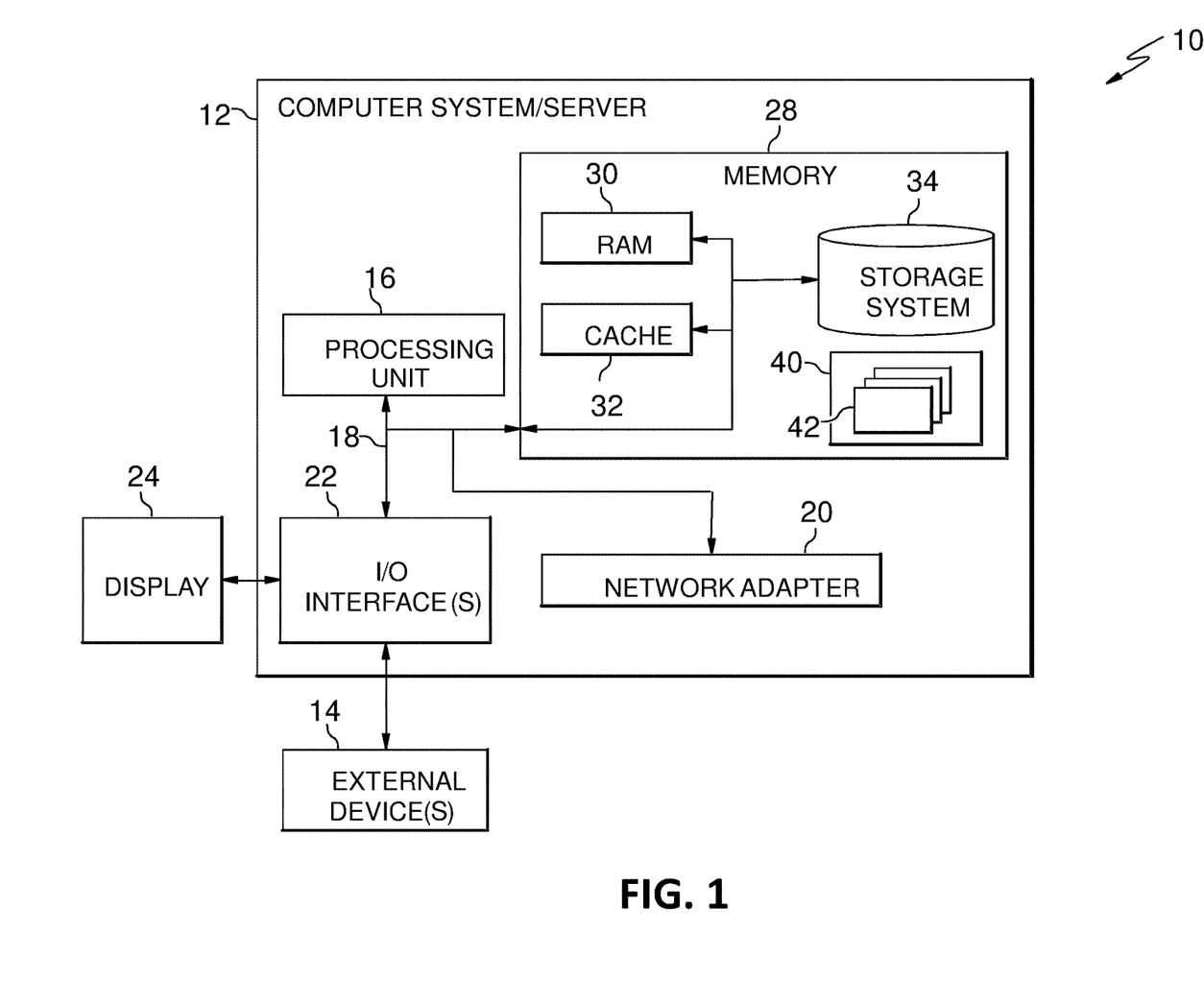
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
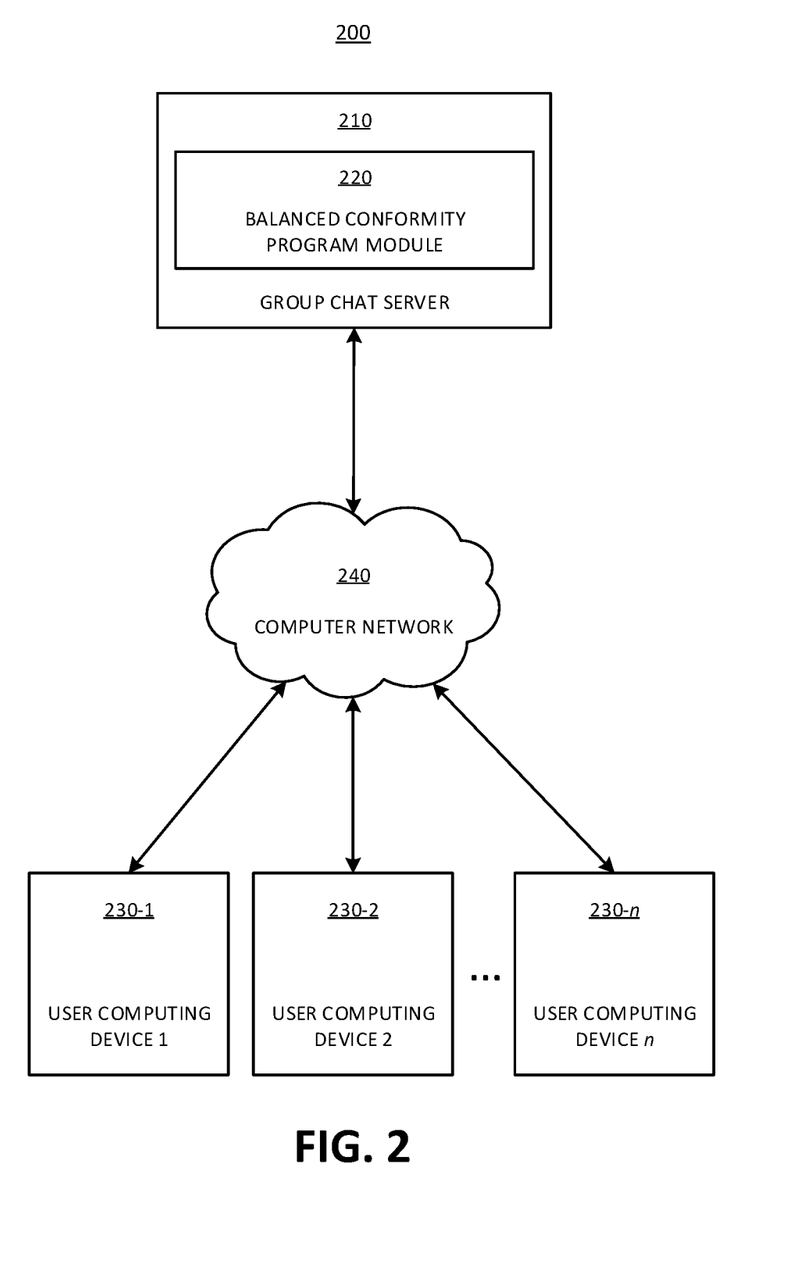
FIG. 2 depicts an illustrative environment in accordance with aspects of the invention.

FIG. 2 depicts an illustrative environment 200 in accordance with aspects of the invention. As shown, the environment 200 comprises a group chat server 210 and a plurality of user computing devices 230-1, 230-2, ..., 230-$n$ which are in communication via a computer network 240. In embodiments, the computer network 240 is any suitable network including any combination of a LAN, WAN, or the Internet. In embodiments, the group chat server 210 and the user computing devices 230-1, 230-2, . . . , 230-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the group chat server 210 is a computer system/server 12 (as shown in FIG. 1). In particular, the group chat server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the group chat server 210 includes a balanced conformity program module 220, which includes hardware and/or software and is one or more of the program modules 42 shown in FIG. 1. According to an embodiment, the balanced conformity program module 220 includes program instructions for mitigating a risk of conformity in a group chat conversation. In embodiments, the program instructions included in the balanced conformity program module 220 of the group chat server 210 are executed by one or more hardware processors.

Still referring to FIG. 2, in embodiments, each of the user computing devices 230-1, 230-2, . . . , 230-n is a computer system/server 12 (as shown in FIG. 1) and is a desktop computer, a laptop computer, a mobile device such as a cellular phone, tablet, personal digital assistant (PDA), or other computing device. In other embodiments, each of the user computing devices 230-1, 230-2, . . . , 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the user computing devices 230-1, 230-2, . . . , 230-n is usable by a user to interact with a group chat hosted by the group chat server 210. In particular, the group chat server 210 causes each of the user computing devices 230-1, 230-2, . . . , 230-n to display a group chat graphical user interface, including group chat messages from a plurality of group chat participants. A user of one of the user computing devices 230-1, 230-2, . . . , 230-n sends a group chat message including text, graphics, videos, sounds, and/or attachments such as files to the group chat server 210 via the computer network 240. The group chat server 240 then causes each of the user computing devices 230-1, 230-2, . . . , 230-n to display the group chat message from the user in real-time. The group chat server 240 stores data pertaining to previous and ongoing group chats, including chat logs and participant lists.

Figure 3:
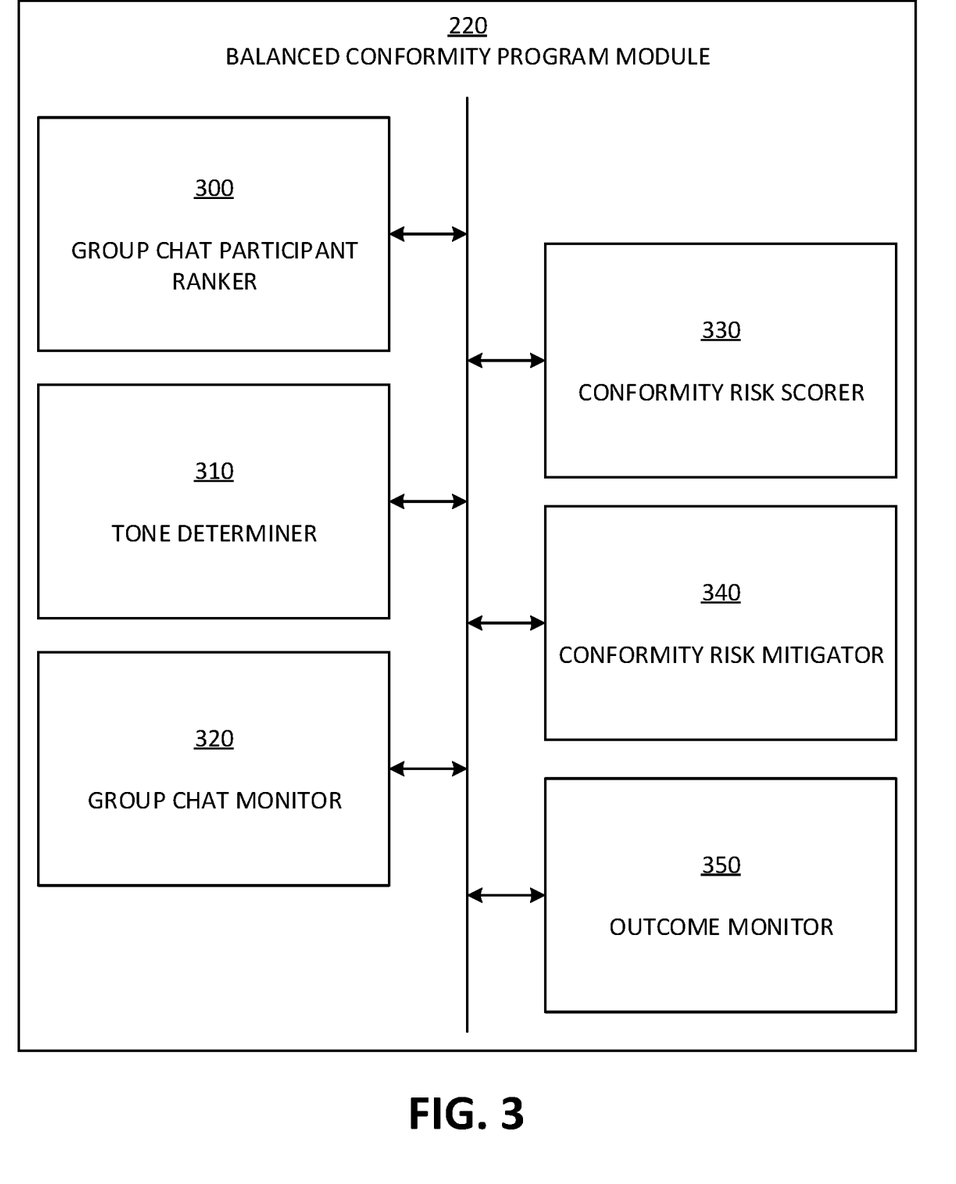
FIG. 3 depicts a block diagram of an exemplary program module in accordance with aspects of the invention.

FIG. 3 depicts a block diagram of an exemplary balanced conformity program module 220 in the group chat server 210 (of FIG. 2) in accordance with aspects of the invention. In embodiments, the balanced conformity program module 220 includes a group chat participant ranker 300, a tone determiner 310, a group chat monitor 320, a conformity risk scorer 330, a conformity risk mitigator 340, and an outcome monitor 350, each of which comprises one or more program modules 42 as described with respect to FIG. 1. In other embodiments, the balanced conformity program module 220 includes additional or fewer components than those shown in FIG. 3. In other embodiments, separate components are integrated into a single computing component or module. Additionally, or alternatively, in embodiments, a single component is implemented as multiple computing components or modules. According to another embodiment, the functions of one or more of the group chat participant ranker 300, the tone determiner 310, the group chat monitor 320, the conformity risk scorer 330, the conformity risk mitigator 340, and the outcome monitor 350 are provided as services in a distributed computing environment.

In embodiments, for each participant in an ongoing group chat conversation in the group chat server 210, the group chat participant ranker 300 collects data on the participant and determines, using the collected data, an influence ranking for the participant that represents a level of influence associated with the participant. In particular, in embodiments, the group chat participant ranker 300 collects data including, for example, a company for which a participant works, a job title, an age, a length of time employed at the company, a number of social media "followers," and/or a number of social media "likes."

In embodiments, in a work-related group chat conversation, the group chat participant ranker 300 determines the influence ranking for each participant in the group chat conversation based on a seniority of the participant (e.g., manager, executive, senior executive, etc.). In a non-work-related group chat conversation, the group chat participant ranker 300 determines the influence ranking for each participant in the group chat conversation based on a popularity of the participant. In an example, relatively higher influence rankings are assigned to participants who are public figures and/or who have a large number of social media followers or likes, and relatively lower influence rankings are assigned to participants who are not public figures and/or who have a relatively smaller number of social media followers or likes.

In embodiments, as new participants join the group chat conversation, the group chat participant ranker 300 also determines an influence ranking for each of the new participants.

Still referring to FIG. 3, in embodiments, the tone determiner 310 determines a baseline tone/sentiment for a topic associated with the ongoing group chat conversation. In particular, the tone determiner 310 uses natural language processing techniques such as emotive analysis to determine each participant's baseline tone or sentiment associated with the topic of the group chat conversation.

In embodiments, the tone determiner 310 analyzes a participant's interactions (e.g., posted messages) in previous group chat conversations using natural language processing techniques such as emotive analysis to determine the participant's independent, baseline tone (e.g., the participant's own opinion, without social influence) on the topic associated with the ongoing group chat conversation. In addition to using emotive analysis, in embodiments, the tone determiner 310 also analyzes the participant's use of emojis, common vernacular, and/or "personal" words that the participant uses to indicate particular sentiments in determining the participant's independent, baseline tone. In other embodiments, the tone determiner 310 also uses a timeframe of the conversation in determining the participant's independent, baseline tone.

Still referring to FIG. 3, in embodiments, the group chat monitor 320 monitors the ongoing group chat conversation to determine a deviation between each participant's independent, baseline tone, as determined by the tone determiner 310 through analysis of previous conversations, and the participant's current tone in the ongoing group chat conversation. In particular, the group chat monitor 320 periodically causes the tone determiner 310 to determine a current tone for each participant in the ongoing group chat conversation. In an example, the group chat monitor 320 causes the tone determiner 310 to determine the current tone for each participant in the ongoing group chat conversation each time a predetermined number of minutes have passed or each time a predetermined number of messages have been posted in the group chat conversation. In another example, in response to a new participant joining the ongoing group chat conversation, the group chat monitor 320 causes the tone determiner 310 to determine the current tone for each participant a predetermined number of minutes after the joining of the new participant or after the new participant has posted a predetermined number of messages in the ongoing group chat conversation.

In embodiments, the group chat monitor 320 periodically causes the tone determiner 310 to analyze a participant's recent interactions (e.g., posted messages) in the ongoing group chat conversation using natural language processing techniques such as emotive analysis to determine the participant's current tone (e.g., the participant's current expressed position, potentially as modified by social influence) on the topic associated with the ongoing group chat conversation. In addition to using emotive analysis, in embodiments, the tone determiner 310 also analyzes the participant's use of emojis, common vernacular, and/or "personal" words that the participant uses to indicate particular sentiments in determining the participant's current tone. In other embodiments, the tone determiner 310 also uses a timeframe of the ongoing group chat conversation in determining the participant's current tone.

In embodiments, the group chat monitor 320 compares each participant's current tone as determined by the tone determiner 310 with the participant's independent, baseline tone, also as determined by the tone determiner 310, to determine a deviation between the participant's current and baseline tones. Because the group chat monitor 320 periodically causes the tone determiner 310 to redetermine each participant's current tone, as discussed above, the group chat monitor 320 is able to track the deviation over time between each participant's current and baseline tones.

Additionally, in embodiments, the group chat monitor 320 uses the determined deviation over time between each participant's current and baseline tones to determine an expected effect of adding to the ongoing group chat conversation additional participants that have a particular baseline tone on the topic associated with the conversation. That is, the group chat monitor 320 determines an expected effect of changing the numbers of participants in the group chat conversation that are aligned with different positions on the topic associated with the conversation. In particular, the group chat monitor 320 uses natural language processing techniques to determine a coefficient representing the expected effect from adding the additional participant on the deviation between the participants' current and baseline tones. In determining the expected effect, the group chat monitor 320 takes into account the influence ranking for the additional participant as determined by the group chat participant ranker 300 as well as the additional participant's baseline tone on the topic as determined by the tone determiner 310.

In embodiments, the group chat monitor 320 also estimates an optimum number of participants aligned with each position on the topic associated with the group chat conversation. For example, the group chat monitor 320 causes the conformity risk scorer 330 to determine a conformity risk, as discussed below, for a plurality of scenarios, each including a different combination of backers on each side of a topic associated with the group chat conversation. That is, the group chat monitor 320 causes the conformity risk scorer 330 to determine a conformity risk score (e.g., as the coefficient) for each scenario of x backers on a first side of the topic and y backers on a second side of the topic. The group chat monitor 320 determines the optimal number of participants aligned with each position on the topic by selecting the scenario that is determined to have the lowest conformity risk score among the plurality of scenarios.

In an example, if one participant in the group chat conversation has a baseline tone associated with a first position on a topic and three participants have baseline tones associated with a second position on the topic, then the group chat monitor 320 determines the expected effect of adding to the group chat conversation an additional participant having a baseline tone associated with the first position on the topic.

Still referring to FIG. 3, in embodiments, the conformity risk scorer 330 uses natural language processing to determine a conformity risk score indicating a probability of conformity in the ongoing group chat conversation. In particular, the conformity risk scorer 330 uses the current and baseline tones determined by the chat monitor 320 as well as the influence ranking for each participant in the group chat conversation determined by the group chat participant ranker 300 to determine the conformity risk score. In embodiments, the conformity risk scorer 330 uses the deviation over time between each participant's current and baseline tones, as determined by the chat monitor 320, as well as an expected future deviation in tone based on the influence ranking for each participant in the group chat conversation determined by the group chat participant ranker 300, in determining the conformity risk score.

For example, if the deviation over time between several participants' current and baseline tones is increasing, and advocacy for a particular position by a group chat participant with the highest influence ranking among all of the group chat participants (as determined by the group chat participant ranker 300) is causing the drift in tone, the conformity risk scorer 330 determines that a relatively higher probability of conformity exists. On the other hand, if the deviation over time between participants' current and baseline tones is not increasing, then the conformity risk scorer 330 determines that a relatively lower probability of conformity exists. Likewise, if two group chat participants with similarly high rankings as determined by the group chat participant ranker 300 are advocating on opposite sides of an issue, then the conformity risk scorer 330 determines that a relatively lower probability of conformity exists.

Still referring to FIG. 3, in embodiments, the conformity risk mitigator 340 uses the conformity risk score determined by the conformity risk scorer 330 to determine whether or not an action is to be taken to mitigate a risk of conformity in the group chat conversation. In embodiments, if a conformity risk score does not exceed a first threshold (e.g., the conformity risk is less than 50%), the conformity risk mitigator 340 takes no action. If the conformity risk score is equal to or exceeds the first threshold but does not exceed a second threshold (e.g., the conformity risk is at least 50% but less than 75%), the conformity risk mitigator 340 prompts participants in the group chat conversation to engage in additional conversation on the topic. If the conformity risk score exceeds the first threshold and is equal to or exceeds the second thresholds (e.g., the conformity risk is at least 75%), then the conformity risk mitigator 340 automatically invites one or more additional participants to the group chat conversation.

In embodiments, the one or more additional participants selected by the conformity risk mitigator 340 are persons having known a known affinity on an opposite side of the topic from the side for which conformity is a risk. In the example discussed above with one participant having a baseline tone associated with the first position on the topic and three participants having baseline tones associated with the second position on the topic, then the conformity risk mitigator 340 selects one or more additional participants that have a known affinity with the first position on the topic, in order to reduce the risk of conformity around the second position on the topic.

In embodiments, the conformity risk mitigator 340 selects a person having a high ranking as determined by the group chat participant ranker 300 as the additional participant to invite to the group chat conversation. In an example, the additional participant invited by the conformity risk mitigator 340 is a person having an influence ranking (as determined by the group chat participant ranker 300) that is higher than that of the other participants in the group chat conversation.

In other embodiments, if no additional participant is available to join the group chat conversation, the conformity risk mitigator 340 inserts a chat bot into the group chat conversation. The chat bot uses artificial intelligence techniques to converse with the other participants in the group chat conversation and backs an opposite side of the topic from the side for which conformity is a risk.

In embodiments, the conformity risk migrator 340 determines the number of additional participants to invite based on the optimum number of participants aligned with each position on the topic associated with the group chat conversation, as determined by the group chat monitor 320. In an example, if an ongoing group chat conversation currently has one backer on a first side of a topic and two backers on a second side of the topic, the conformity risk migrator 340, based upon a determination by the group chat monitor 320 that an optimal number of backers on each side of the topic is three, invites to the group chat conversation two additional participants backing the first side of the topic and one additional participant baking the second side of the topic.

In embodiments, the conformity risk mitigator 340 prompts participants in the group chat conversation to engage in additional conversation on the topic by displaying a message in a group chat graphical user interface that is displayed on each of the plurality of user computing devices 230-1, 230-2, . . . , 230-n used by each of the participants in the group chat conversation. In other embodiments, the conformity risk mitigator 340 only displays the message in the group chat graphical user interface that is displayed on the one of the user computing devices 230-1, 230-2, . . . , 230-n that is used by the participant that is ranked the highest by the group chat participant ranker 300.

In embodiments, the conformity risk mitigator 340 automatically invites the additional participant to the group chat conversation by displaying an invitation message in a group chat graphical user interface that is displayed on one of the user computing devices 230-1, 230-2, . . . , 230-n used by the additional participant. Alternatively, in other embodiments, the message is transmitted via email, short message service (SMS), or via any other mechanism, to one of the user computing devices 230-1, 230-2, . . . , 230-n used by the additional participant. In embodiments, the conformity risk mitigator 340 also displays a message indicating that the additional participant has been invited in a group chat graphical user interface that is displayed on each of the plurality of user computing devices 230-1, 230-2, . . . , 230-n used by each of the participants in the group chat conversation.

Still referring to FIG. 3, in embodiments, the outcome monitor 350 monitors the group chat to determine the efficacy of the action taken by the conformity risk mitigator 340. In particular, at predetermined intervals following the action taken by the conformity risk mitigator 340 (or the decision by the conformity risk mitigator 340 to take no action), the outcome monitor 350 causes the tone determiner 310 to determine the current tone for each participant. In an example, the outcome monitor 350 causes the tone determiner 310 to determine the current tone for each participant a predetermined number of minutes after the action taken by the conformity risk mitigator 340 or after a predetermined number of additional messages have been posted to the group chat conversation.

In embodiments, in response to a decrease in deviation between the current tone and baseline tone for the participants in the group chat conversation, the outcome monitor 350 determines that the action taken by the conformity risk mitigator 340 (or the decision by the conformity risk mitigator 340 to take no action) was successful. In embodiments, the outcome monitor 350 determines a degree or level of success based upon a magnitude of the decrease in deviation between the current tone and baseline tone for the participants in the group chat conversation. On the other hand, in response to an increase in deviation between the current tone and baseline tone, the outcome monitor 350 determines that the action taken by the conformity risk mitigator 340 (or the decision by the conformity risk mitigator 340 to take no action) was unsuccessful.

In other embodiments, the outcome monitor 350 causes the conformity risk scorer 330 to determine a conformity risk score at predetermined intervals following the action taken by the conformity risk mitigator 340 (or the decision by the conformity risk mitigator 340 to take no action). In an example, the outcome monitor 350 causes the conformity risk scorer 330 to determine the conformity risk score a predetermined number of minutes after the action taken by the conformity risk mitigator 340 or after a predetermined number of additional messages have been posted to the group chat conversation.

In embodiments, in response to a decrease in the conformity risk score (i.e., the current conformity risk score is lower than the conformity risk score that promoted the action to be taken by the conformity risk mitigator 340), the outcome monitor 350 determines that the action taken by the conformity risk mitigator 340 (or the decision by the conformity risk mitigator 340 to take no action) was successful. In embodiments, the outcome monitor 350 determines a degree or level of success based upon a magnitude of the decrease in the conformity risk score. On the other hand, in response to an increase in the conformity risk score, the outcome monitor 350 determines that the action taken by the conformity risk mitigator 340 (or the decision by the conformity risk mitigator 340 to take no action) was unsuccessful.

In embodiments, the outcome monitor 350 uses machine learning to adjust (tune) the thresholds (e.g., the first and second thresholds) used by the conformity risk mitigator 340. In an example, in response to a determination by the conformity risk mitigator 340 to take no action resulting in an unsuccessful outcome (determined as discussed above), the outcome monitor 350 lowers the first threshold used by the conformity risk mitigator 340. In another example, in response to a determination by the conformity risk mitigator 340 to prompt participants in the group chat conversation to engage in additional conversation on the topic resulting in an unsuccessful outcome, the outcome monitor 350 lowers the second threshold used by the conformity risk mitigator 340.

Figure 4:
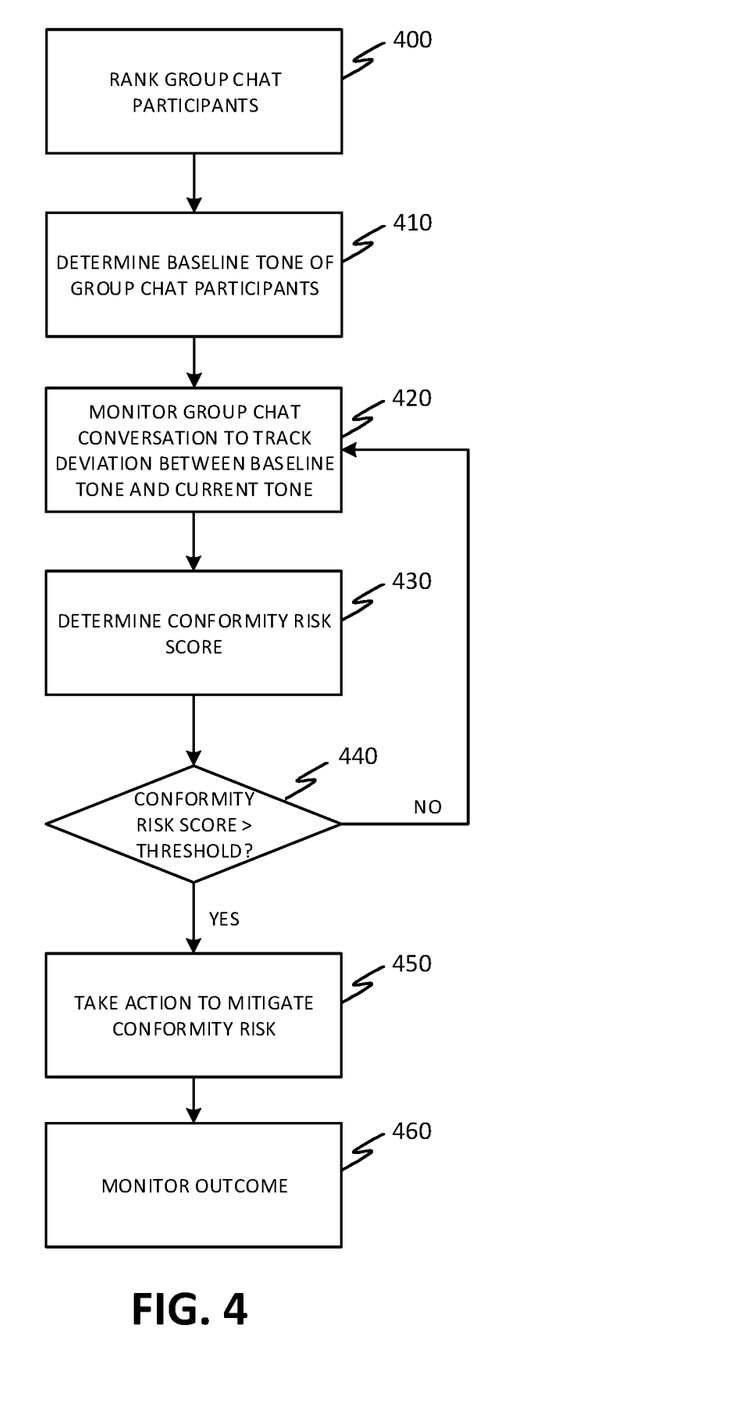
FIG. 4 depicts a flowchart of an exemplary method in accordance with aspects of the invention.

FIG. 4 depicts a flowchart of an exemplary method in accordance with aspects of the invention. The steps of the method are performed in the environment of FIG. 2 and are described with reference to the elements and steps described with respect to FIGS. 1, 2, and 3.

At step 400, the system ranks group chat participants. In embodiments, as described with respect to FIG. 3, step 400 comprises the group chat participant ranker 300 collecting data on each participant in a group chat conversation and determining, using the collected data, an influence ranking for each participant that represents a level of influence associated with the participant.

At step 410, the system determines a baseline tone for each of the group chat participants. In embodiments, as described with respect to FIG. 3, step 410 comprises the tone determiner 310 analyzing a participant's interactions (e.g., posted messages) in previous group chat conversations using natural language processing techniques such as emotive analysis to determine the participant's independent, baseline tone (e.g., the participant's own opinion, without social influence) on the topic associated with the group chat conversation.

At step 420, the system monitors the group chat conversation to track the deviation between each participant's baseline tone and current tone. In embodiments, as described with respect to FIG. 3, step 420 comprises the group chat monitor 320 monitoring an ongoing group chat conversation to determine the deviation between each participant's baseline tone, as determined by the tone determiner 310 through analysis of previous conversations, and the participant's current tone in the ongoing group chat conversation.

At step 430, the system determines a conformity risk score. In embodiments, as described with respect to FIG. 3, step 430 comprises the conformity risk scorer 330 using natural language processing to determine a conformity risk score indicating a probability of conformity in the ongoing group chat conversation.

At step 440, the system determines whether or not the conformity risk score is greater than a threshold. In embodiments, as described with respect to FIG. 3, step 440 comprises the conformity risk mitigator 340 using the conformity risk score determined by the conformity risk scorer 330 to determine whether or not an action is to be taken to mitigate a risk of conformity in the group chat conversation. If it is determined at step 440 that the conformity risk score is not greater than the threshold, then flow returns to step 420. On the other hand, if it is determined at step 440 that the conformity risk score is greater than the threshold, then flow proceeds to step 450.

At step 450, the system takes an action to mitigate the conformity risk. In embodiments, as described with respect to FIG. 3, step 450 comprises the conformity risk mitigator 340 prompting participants in the group chat conversation to engage in additional conversation on the topic and/or automatically inviting one or more additional participants to the group chat conversation.

At step 460, the system monitors the outcome of the group chat conversation. In embodiments, as described with respect to FIG. 3, step 450 comprises the outcome monitor 350 monitoring the group chat to determine the efficacy of the action taken by the conformity risk mitigator 340 and optionally tuning the threshold.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining, by a computing device, a conformity risk score using a baseline tone and a current tone for a plurality of participants in an ongoing digital group chat;
    inserting, by the computing device, a chat bot into the ongoing digital group chat;
    in response to determining that the conformity risk score exceeds a first predetermined threshold, the computing device automatically inviting an additional participant to join the ongoing digital group chat;
    determining an updated conformity risk score subsequent to the automatically inviting the additional participant to join the ongoing digital group chat; and
    determining an efficacy of the first threshold based on the conformity risk score and the updated conformity risk score.

2. The method according to claim 1, further comprising determining, by the computing device, the baseline tone for the plurality of participants in the ongoing digital group chat;
  wherein the determining the baseline tone comprises using natural language processing techniques to analyze previous group chats.

3. The method according to claim 2, wherein the natural language processing techniques comprise emotive analysis.

4. The method according to claim 1, wherein the determining the conformity risk score comprises using natural language processing to determine a probability of conformity in the ongoing digital group chat.

5. The method according to claim 1, further comprising in response to determining that the conformity risk score exceeds a second predetermined threshold but does not exceed the first predetermined threshold, displaying a message prompting the plurality of participants to engage in additional conversation.

6. The method according to claim 1, further comprising determining an influence ranking for each of the plurality of participants in the ongoing digital group chat, wherein the additional participant is selected such that the influence ranking of the additional participant is higher than the influence ranking of each of the plurality of participants in the ongoing digital group chat.

7. The method according to claim 1, further comprising adjusting the first threshold based on the determined efficacy of the first threshold.

8. A computer program product comprising a computer readable storage medium having program instructions embodied therewith, the program instructions executable by a computing device to cause the computing device to:
  determine a conformity risk score indicating a probability of conformity among a plurality of participants in an ongoing digital group chat;
  insert a chat bot into the ongoing digital group chat;
  in response to determining that the conformity risk score exceeds a first predetermined threshold, automatically invite an additional participant to join the ongoing digital group chat; and
  determine an influence ranking for each of the plurality of participants in the ongoing digital group chat,
  wherein the additional participant is selected such that the influence ranking of the additional participant is higher than the influence ranking of each of the plurality of participants in the ongoing digital group chat.

9. The computer program product according to claim 8, wherein the determining the conformity risk score comprises determining a baseline tone using natural language processing techniques to analyze previous group chats and determining a current tone using the natural language processing techniques to analyze the ongoing digital group chat.

10. The computer program product according to claim 8, the program instructions further being executable by the computing device to cause the computing device to:
  determine a first updated conformity risk score;
  determine an efficacy of the first threshold based on the conformity risk score and the first updated conformity risk score; and
  adjust the first threshold based on the determined efficacy of the first threshold.

11. The computer program product according to claim 10, the program instructions further being executable by the computing device to cause the computing device to:
  determine a second updated conformity risk score subsequent to the automatically inviting the additional participant to join the ongoing digital group chat;
  determine an efficacy of a second threshold based on the conformity risk score and the second updated conformity risk score; and
  adjust the second threshold based on the determined efficacy of the second threshold.

12. The computer program product according to claim 8, wherein the influence ranking for a particular one of the plurality of participants is based at least in part on a number of social media followers that follow the particular one of the plurality of participants.

13. The computer program product according to claim 8, wherein the additional participant is the chat bot.

14. The computer program product according to claim 8, wherein the chat bot uses artificial intelligence techniques to converse with the participants in the ongoing digital group chat, and
  the chat bot supports an opposite side of a topic from a side for which the conformity risk score exceeds the first predetermined threshold.

15. A system comprising:
  a hardware processor, a computer readable memory, and a computer readable storage medium associated with a computing device;
  program instructions configured to determine a conformity risk score using a baseline tone and a current tone for a plurality of participants in an ongoing digital group chat;
  program instructions configured to insert a chat bot into the ongoing digital group chat;
  program instructions configured to, in response to determining that the conformity risk score exceeds a first predetermined threshold, automatically invite an additional participant to join the ongoing digital group chat;
  program instructions configured to determine an updated conformity risk score subsequent to the automatically inviting the additional participant to join the ongoing digital group chat; and
  program instructions configured to determine an efficacy of the first threshold based on the conformity risk score and the updated conformity risk score,
  wherein the program instructions are stored on the computer readable storage medium for execution by the hardware processor via the computer readable memory.

16. The system according to claim 15, further comprising program instructions configured to determine a current tone for the plurality of participants in the ongoing digital group chat,
  wherein the determining the current tone comprises using the natural language processing techniques to analyze the ongoing digital group chat.

17. The system according to claim 16, wherein the natural language processing techniques comprise emotive analysis.

18. The system according to claim 15, wherein the determining the conformity risk score comprises using natural language processing to determine a probability of conformity in the ongoing digital group chat.

19. The system according to claim 15, further comprising program instructions configured to, in response to determining that the conformity risk score exceeds a second predetermined threshold but does not exceed the first predetermined threshold, display a message prompting the plurality of participants to engage in additional conversation.

20. The system according to claim 15, further comprising program instructions configured to adjust the first threshold based on the determined efficacy of the first threshold.

\* \* \* \* \*